United States Patent [19]
Garrison et al.

[11] Patent Number: 6,069,422
[45] Date of Patent: May 30, 2000

[54] NOISE REDUCTION MOTOR DESIGN AND METHOD

[75] Inventors: Bobby D. Garrison; Leslie A. Lyons, both of Cassville, Mo.

[73] Assignee: Fasco Industries, Inc., Cassville, Mo.

[21] Appl. No.: 09/264,079

[22] Filed: Mar. 5, 1999

Related U.S. Application Data

[60] Provisional application No. 60/077,151, Mar. 6, 1998.

[51] Int. Cl.[7] ...................................................... H02K 5/24
[52] U.S. Cl. ............................................. 310/51; 310/261
[58] Field of Search .............................. 310/51, 159, 166, 310/185, 172, 261; 29/609, 596

[56] References Cited

U.S. PATENT DOCUMENTS

| | | | |
|---|---|---|---|
| 3,564,314 | 2/1971 | Haydon | 310/172 |
| 4,131,814 | 12/1978 | Donahoo | 310/172 |
| 4,234,810 | 11/1980 | Donahoo | 310/172 |
| 4,316,113 | 2/1982 | Sato et al. | 310/172 |
| 4,371,802 | 2/1983 | Morrill | 310/166 |
| 4,524,293 | 6/1985 | Komatsu | 310/46 |
| 5,233,248 | 8/1993 | Kawamura et al. | 310/88 |
| 5,442,250 | 8/1995 | Stridsberg | 310/186 |
| 5,604,971 | 2/1997 | Steiner | 29/596 |
| 5,627,424 | 5/1997 | Steiner | 310/258 |

*Primary Examiner*—Nestor Ramirez
*Assistant Examiner*—Joseph Waks
*Attorney, Agent, or Firm*—Anthony M. Lorusso; Lorusso & Loud

[57] ABSTRACT

An electric motor design and method useful to reduce noise/vibration generated by a rotor/shaft assembly is provided whereby the motor has a stator which has an axial length and a rotor which has an axial length less than the axial length of the stator such that when the rotor rotates within the motor, the rotor is axially fixed by a stator field.

1 Claim, 10 Drawing Sheets

NOISE REDUCTION MOTOR DESIGN AND METHOD

CROSS-REFERENCE TO RELATED APPLICATION

The present application claims the benefit of Provisional Application Ser. No. 60/077,151 filed Mar. 6, 1998, the teachings of which are incorporated herein by reference.

BACKGROUND OF THE INVENTION

1. Field of the Invention

This invention relates generally to electric motors. More specifically, the invention relates to a design for reducing noise production in running electric motors.

2. Description of Related Art

One of the most daunting problems faced by motor designers concerns the production of noise and associated vibration by various motor components. One of the many sources of noise/vibration is derived from the axial movement of an electric motor's rotor/shaft assembly during motor operation within the boundaries of the bearings or other shaft supporting mechanisms employed. The play that has to be designed into a motor in order to allow for rotor/shaft rotation inevitably provides the environment for motor shaft axial movement.

The axial movement of an electric motor's rotor/shaft assembly also leads to considerable wear of the components that are contacted by the rotating shaft. The components include bearings and items such as impellers that are attached to the shaft. Constant axial movement, apart from creating the possibility of more rapid wear of motor components also magnifies any undesirable noise generated by the components attached to the shaft that are designed to move radially about the shaft.

This problem, which is present in virtually all electric motors, is particularly pronounced in electric motors that are run on AC electric current. It is well known that a motor operating on a typical 60 Hz AC signal develops considerable noise at twice line frequency. FIGS. 1 and 2 are graphs which illustrate typical sound signatures generated by common shaded pole motors. As is clearly shown, at twice line frequency, the decibel levels achieved by the motors reach approximately 70 and 76 decibels, respectively. These are common but unacceptable decibel levels.

Numerous techniques have been employed to address this problem of motor design. One way of minimizing the problem is to adhere or mechanically affix roller or sleeve bearings to the shaft and set the bearings in bearing seats having very tight tolerances. An example of a typical "sleeve bearing" is shown in FIG. 4 where a shaft 3 is secured by sleeve bearings 4. An example of a typical "ball bearing" is shown in FIG. 5 where the shaft 3 is secured by ball bearings 5. This approach attempts to "lock" the shaft in place by virtue of very tight tolerances. Unfortunately, it only takes one two-thousandth of an inch play to enable a running motor to create noise via axial movement of the rotor/shaft assembly. Although this method can reduce some of the undesired noise production, it also creates the possibility of greater wear of the rotating components and the components within which the rotating components rotate.

Another technique used to reduce noise, albeit not at twice line frequency, is described in U.S. Pat. No. 5,497,039 to Blaettner et al. In the '039 patent, the armature/shaft assembly of a DC motor is preloaded to force the shaft against one end of the motor. This is accomplished by employing an armature/permanent magnet arrangement whereby the permanent magnets affixed to the casing of the DC motor overhang the armature in the axial direction. The armature is then offset to the magnets to create the preload condition which causes the armature to be forced into one end of the motor casing. To compensate or, more accurately, to dampen the effect of the preload force on the motor casing end against which the armature is being forced, a combination of an elastomeric washer and a hard plastic washer is used.

Although this method will eliminate some of the axial noise/vibration, it ultimately does not eliminate an acceptable amount of noise/vibration as is graphically illustrated in FIGS. 6–9. It does not address the problem of noise at twice line frequency. A more detailed explanation of the loss is provided below.

The described methods for reducing noise/vibration production via oscillation/axial movement of the rotor/shaft assembly are all marginally beneficial but with discernable drawbacks. A design and method has now been discovered which significantly reduces the noise/vibration production while minimizing the detrimental effects exhibited by the other known designs and methods.

It is thus an object of the invention to provide a motor design and method for reducing the noise/vibration that is generated by the axial movement of a rotating shaft within an electric motor.

It is a further object of the invention to significantly reduce the noise/vibration generated by an AC motor at twice line frequency.

It is another object of the invention to provide a design which enhances manufacturability and cost-effectiveness of an electric motor.

SUMMARY OF THE INVENTION

The motor design and method described herein includes a stator/rotor assembly comprising a rotor having an axial length shorter than the axial length of the stator. Noise/vibration reduction is accomplished by axially centering the rotor within the stator so that the rotor is encapsulated or "trapped" by magnetic flux generated by the operating motor.

A method of reducing noise/vibration generated in an electric motor by the oscillation/axial movement of a rotor situated within the electric motor is described wherein a stator is provided having an axial length and a rotor is provided having an axial length less than the axial length of the stator. An electric line current, preferably an AC current, is then applied to the motor which generates magnetic flux which causes the rotor to rotate within the parameters of the stator field.

This design and method of reducing axial movement of a spinning rotor/shaft assembly can be applied to a wide variety of motor types including, by way of illustration but not limitation, two-pole shaded pole, four-pole shaded pole and permanent-split capacitor types. It is particularly relevant to AC motors since this new design is particularly effective at eliminating rotor oscillation in the stator field at the peak of the sine wave (120 Hz or twice line frequency).

DESCRIPTION OF THE PREFERRED EMBODIMENTS

A typical electric motor design that is well known in the art combines a stator and rotor that are of equal lengths. When assembled, the stator and rotor are axially aligned. When an electrical current is applied to such a motor, the rotor begins rotating in response to the magnetic flux generated by the field winding on the stator. Because the rotor cannot be completely fixed in the axial direction, the rotor begins to oscillate or move in the axial direction while rotating about its axis. The oscillation is especially pronounced at twice line frequency, e.g., 120 Hz for a 60 Hz line frequency and 100 Hz for a 50 Hz line frequency, for AC powered motors.

Figure 1:
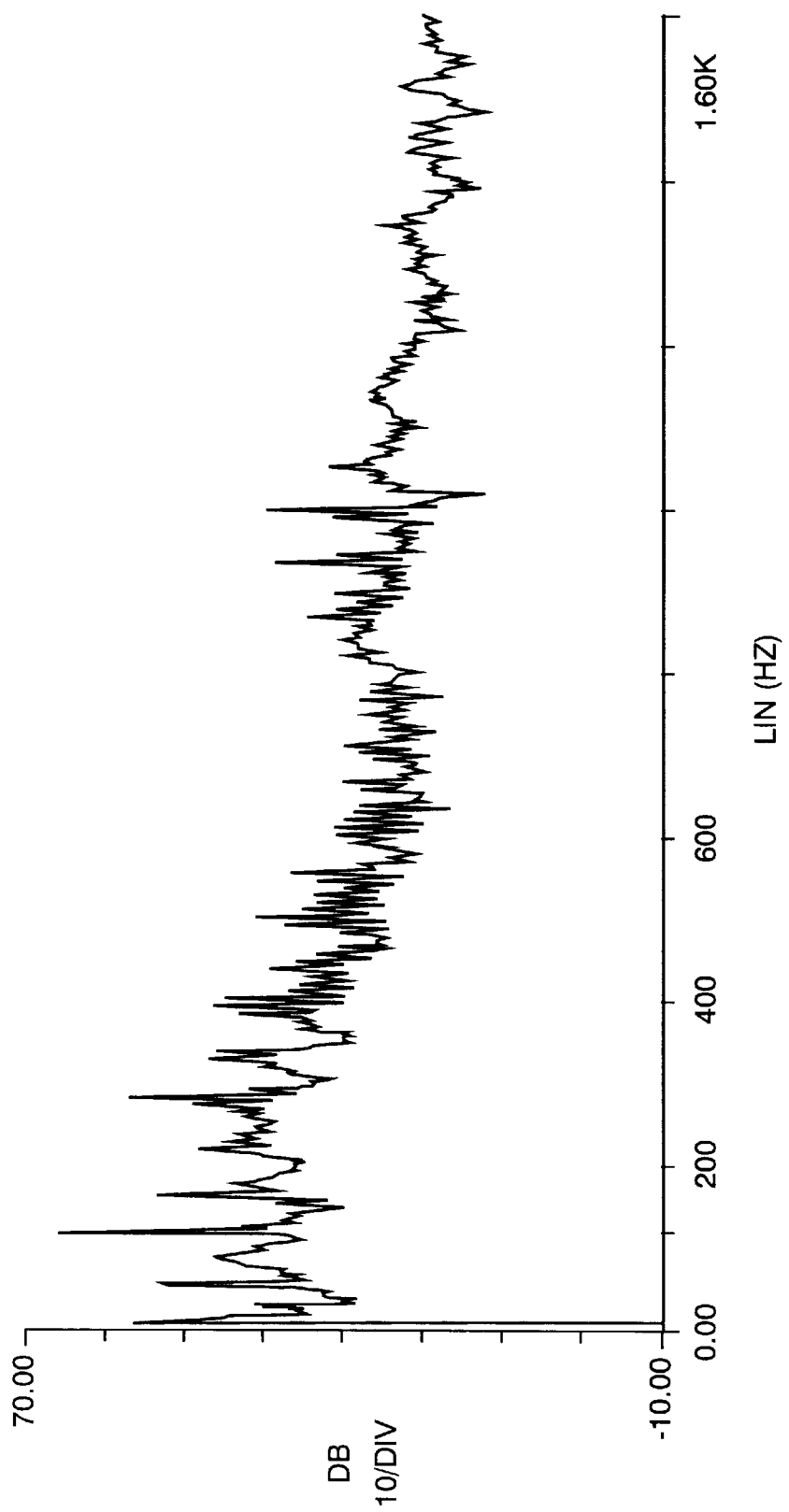
FIG. 1 is a graph showing the sound signature of an operating prior art AC motor.
Figure 2:
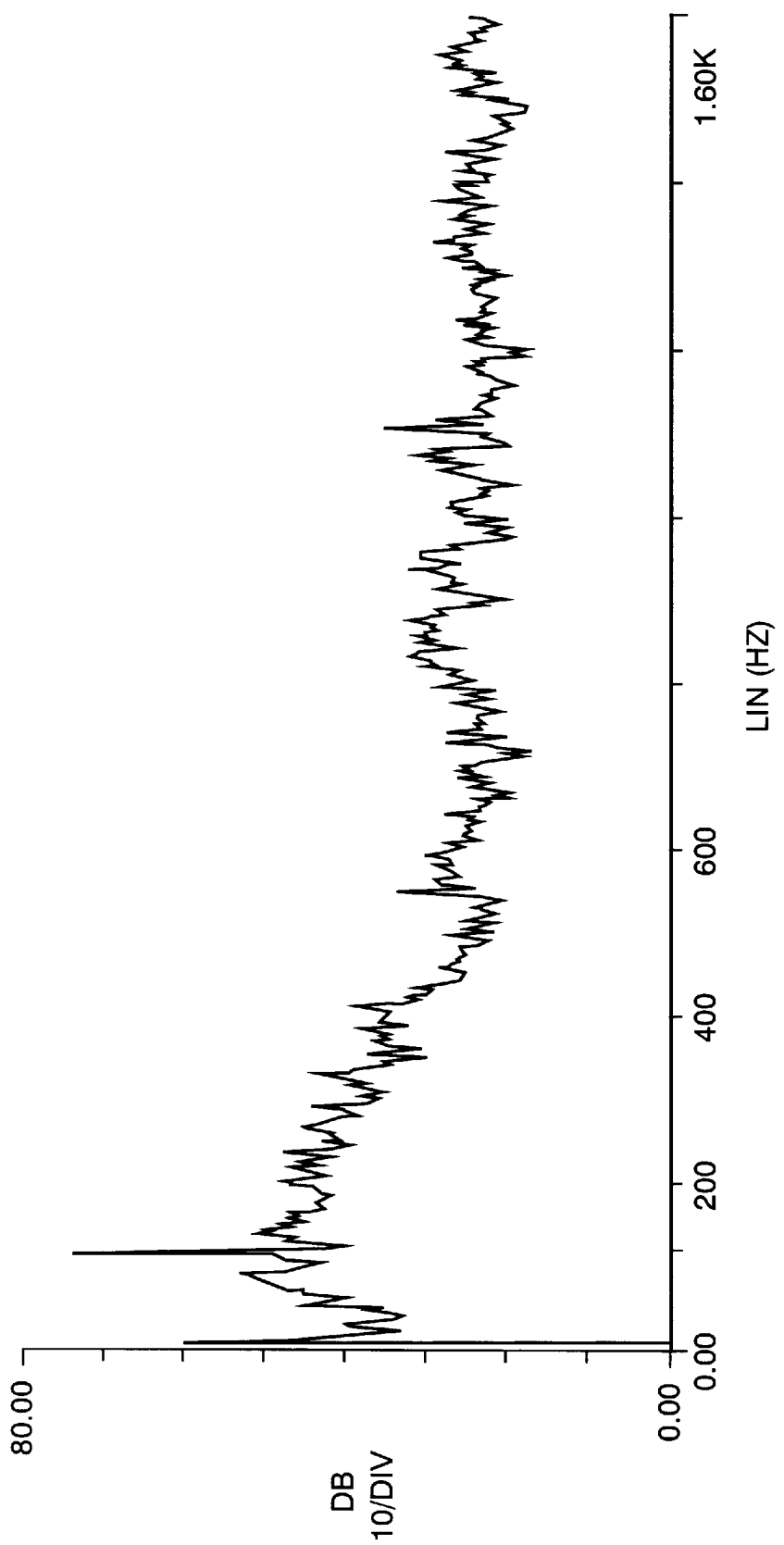
FIG. 2 is a graph showing the sound signature of an another prior art operating AC motor.

The manifestation of this phenomenon is graphically depicted by the sound signatures of prior art motors shown in FIGS. 1 and 2. At twice line frequency, the decibel levels generated approach or exceed 70 decibels. This problem is exacerbated by the transmission of the vibration to any component attached to the rotor shaft. For example, a motor used in a blower exhaust for a water heater is attached to flue piping which is typically in contact with studs in a building structure. The vibration created by the motor is transmitted to the blower housing and to the flue pipe. This can cause the flue pipe to rattle against the building studs which magnifies the noise/vibration.

To the surprise of the inventors, it has been discovered that by shortening the rotor relative to the stator and centering the rotor axially within the axial length of the stator, the oscillations/axial movements exhibited by a rotating shaft, particularly at twice line frequency are considerably diminished. Sound signatures and Magnetic Finite Element Analysis of the design compared to sound signatures and Magnetic Finite Element Analysis of prior art motors have confirmed the surprising results.

Figure 3:
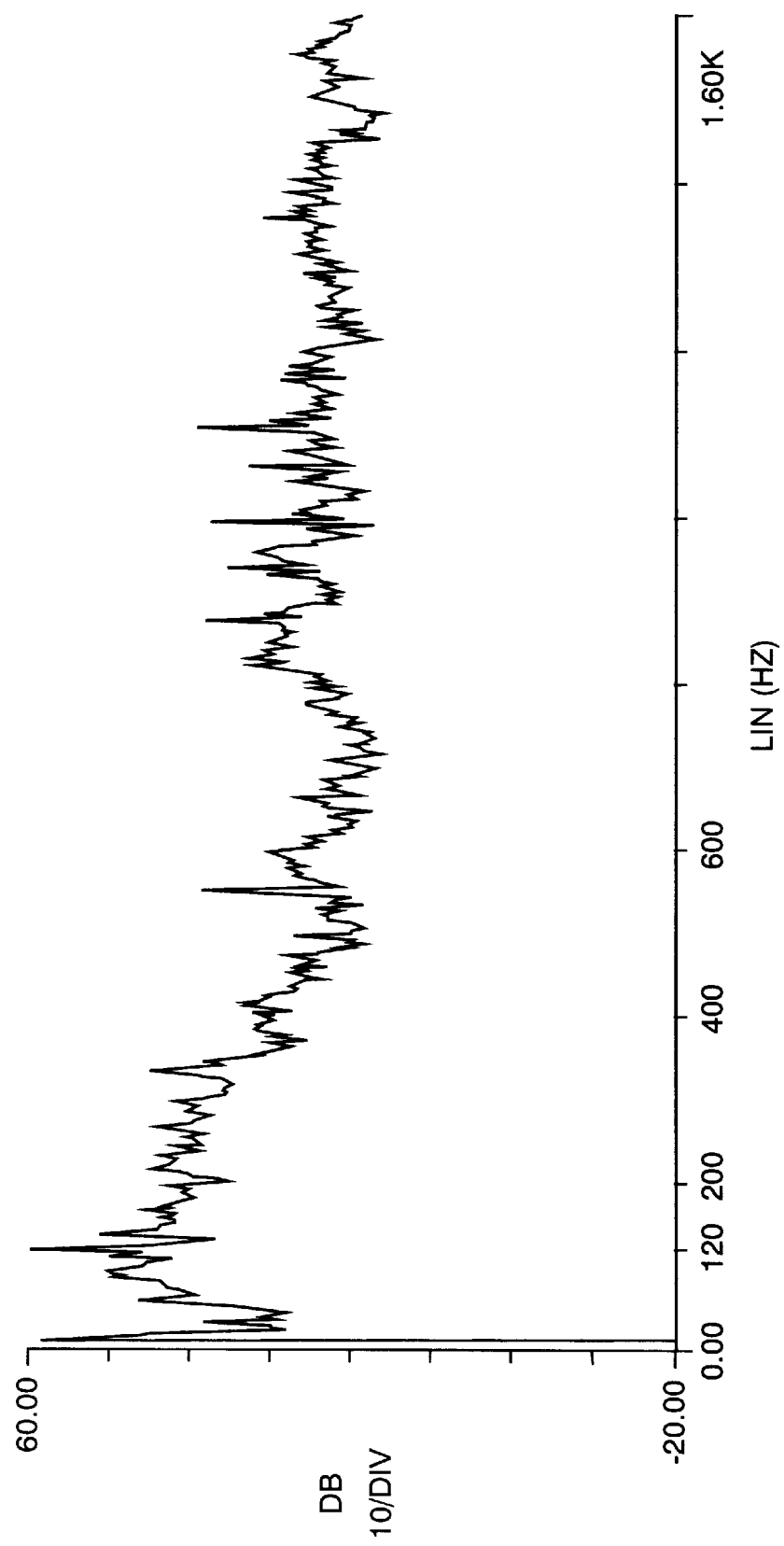
FIG. 3 is a graph showing the sound signature of an AC motor constructed according to one embodiment of the invention.
Figure 4:
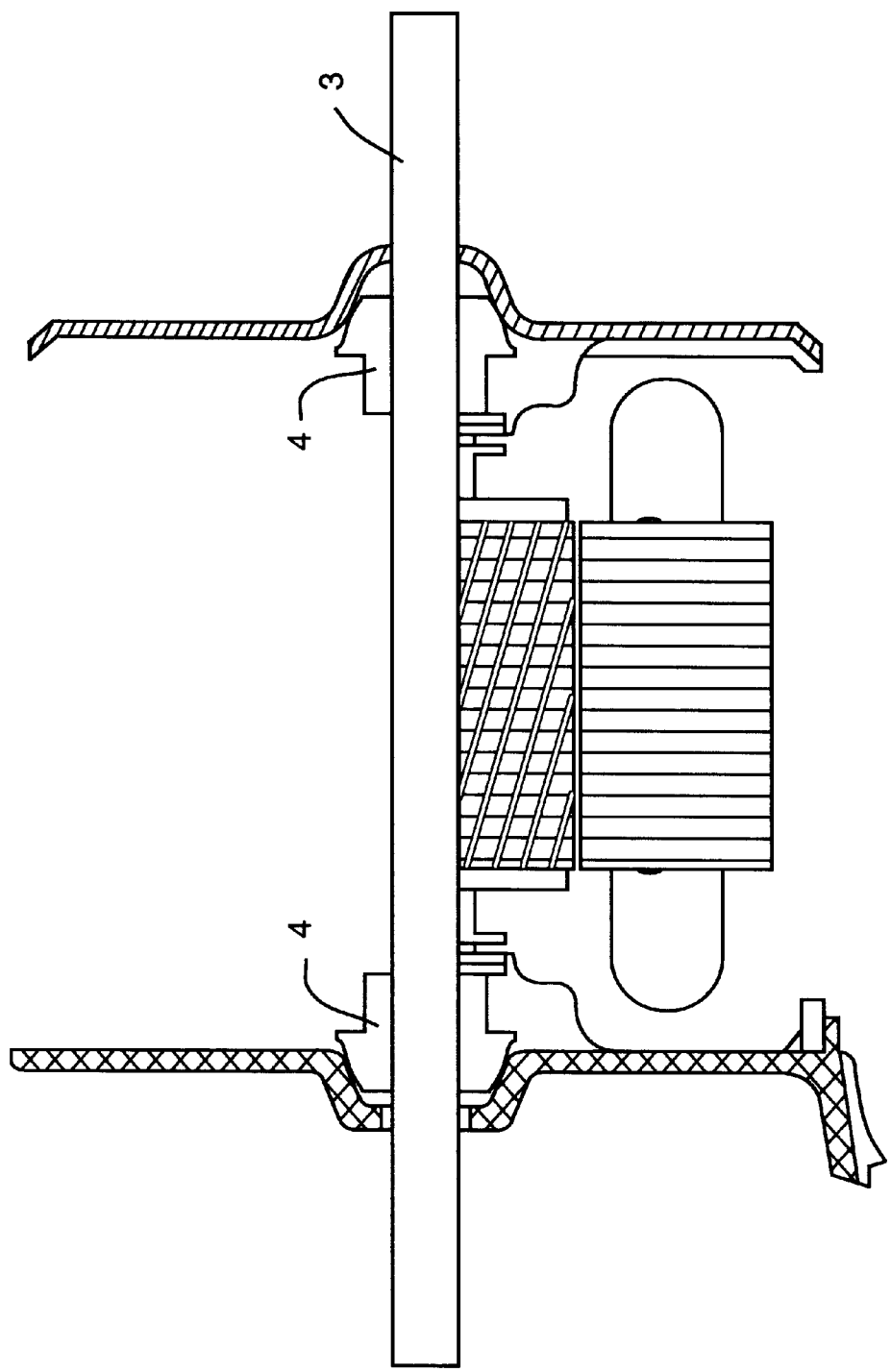
FIG. 4 is a prior art motor design using a sleeve bearing to secure the rotor/shaft assembly.
Figure 5:
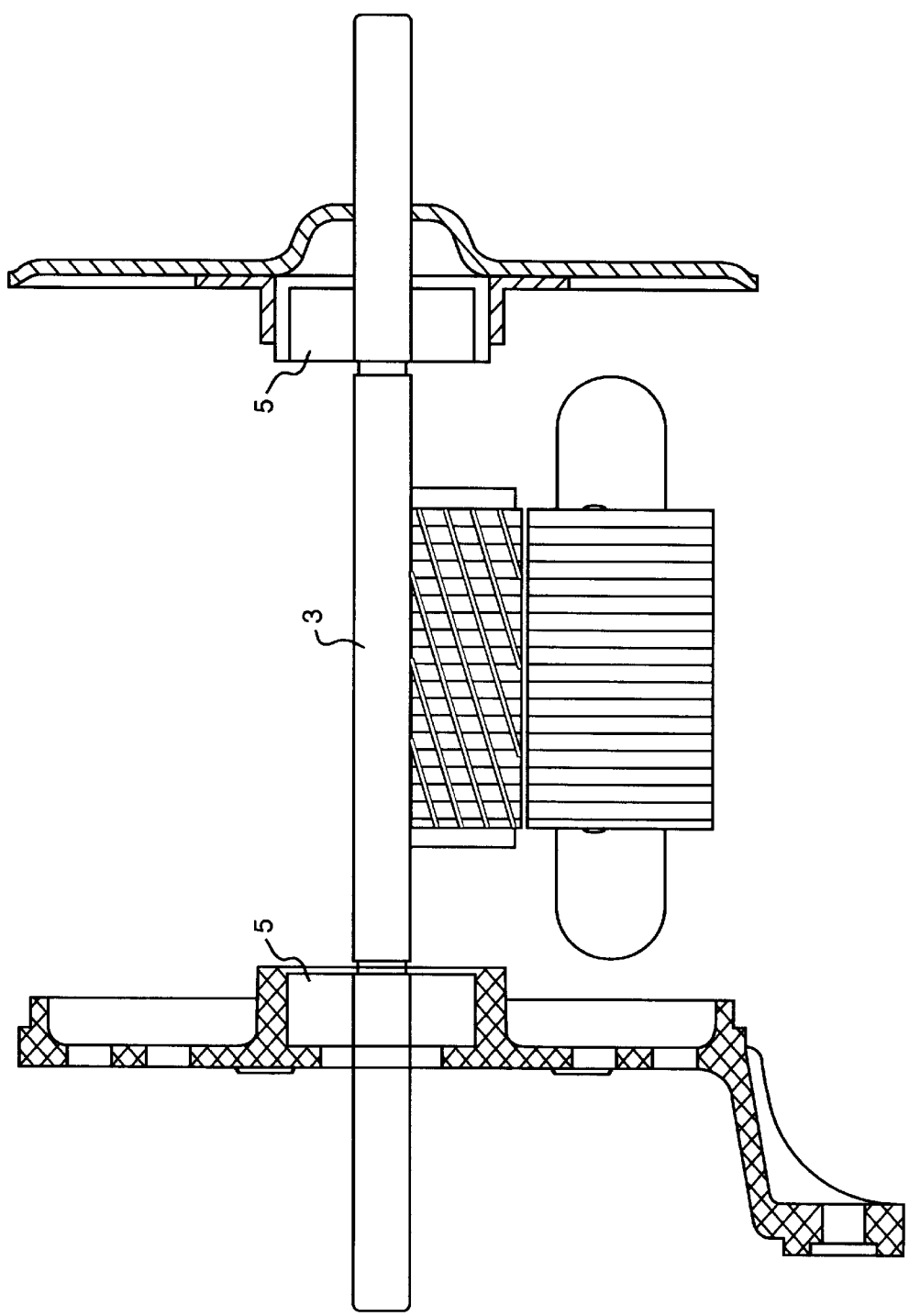
FIG. 5 is a prior art motor design using a ball bearing to secure the rotor/shaft assembly.

As shown in FIGS. 1 and 2 the sound signatures for the noise generated by the rotor/shaft assemblies of the two prior art motors is approximately 70 and 76 decibels. In contrast, the sound signature of a motor made in accordance with the invention is approximately 59 decibels as shown in FIG. 3. The significant reduction is noise is directly attributable to the reduction is axial movement of the rotor/shaft assembly.

This point is illustrated by the Magnetic Finite Element Analysis tests shown in FIGS. 6–9. These tests were conducted to ascertain the magnetic forces applied to the rotor based upon the rotor's orientation to the stator. By ascertaining this, it is possible to determine the amount of axial force being passed along the rotor/shaft assembly by one motor relative to another.

The forces measured are the magnetic forces visited upon the rotor. By displacing the rotor relative to the stator and taking measurements of the magnetic forces applied to the rotor at the different positions, the magnetic stored energy resulting from the displacement can be calculated by subtracting an aligned position magnetic energy from an offset position magnetic energy. The magnetic energy number derived represents the magnetic force on the rotor available for displacing the rotor and generating noise. The resulting number can then be compared to the results for other motors in order to compare the differences in axial forces passed along the rotor/shaft assembly.

Figure 6:
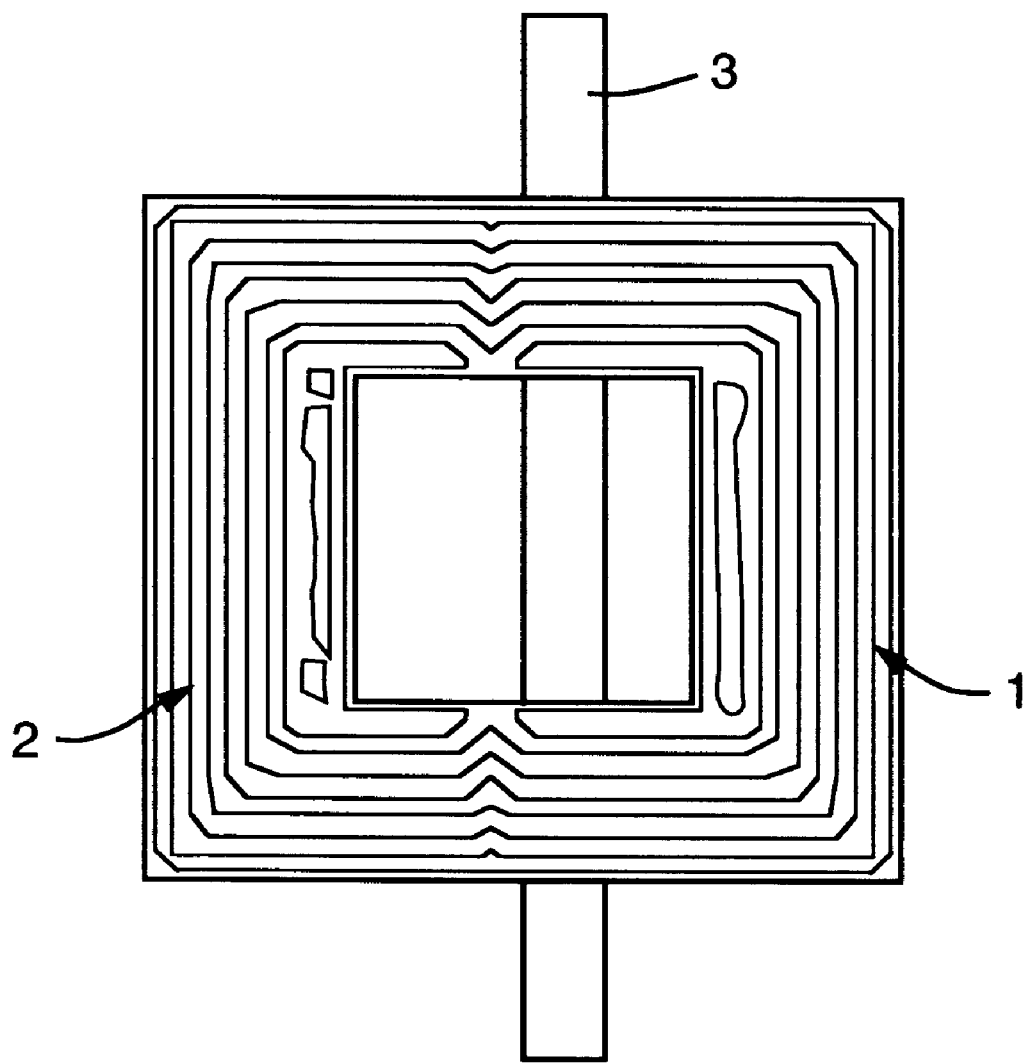
FIG. 6 is a magnetic Finite Element Analysis graph of a prior art motor.
Figure 7:
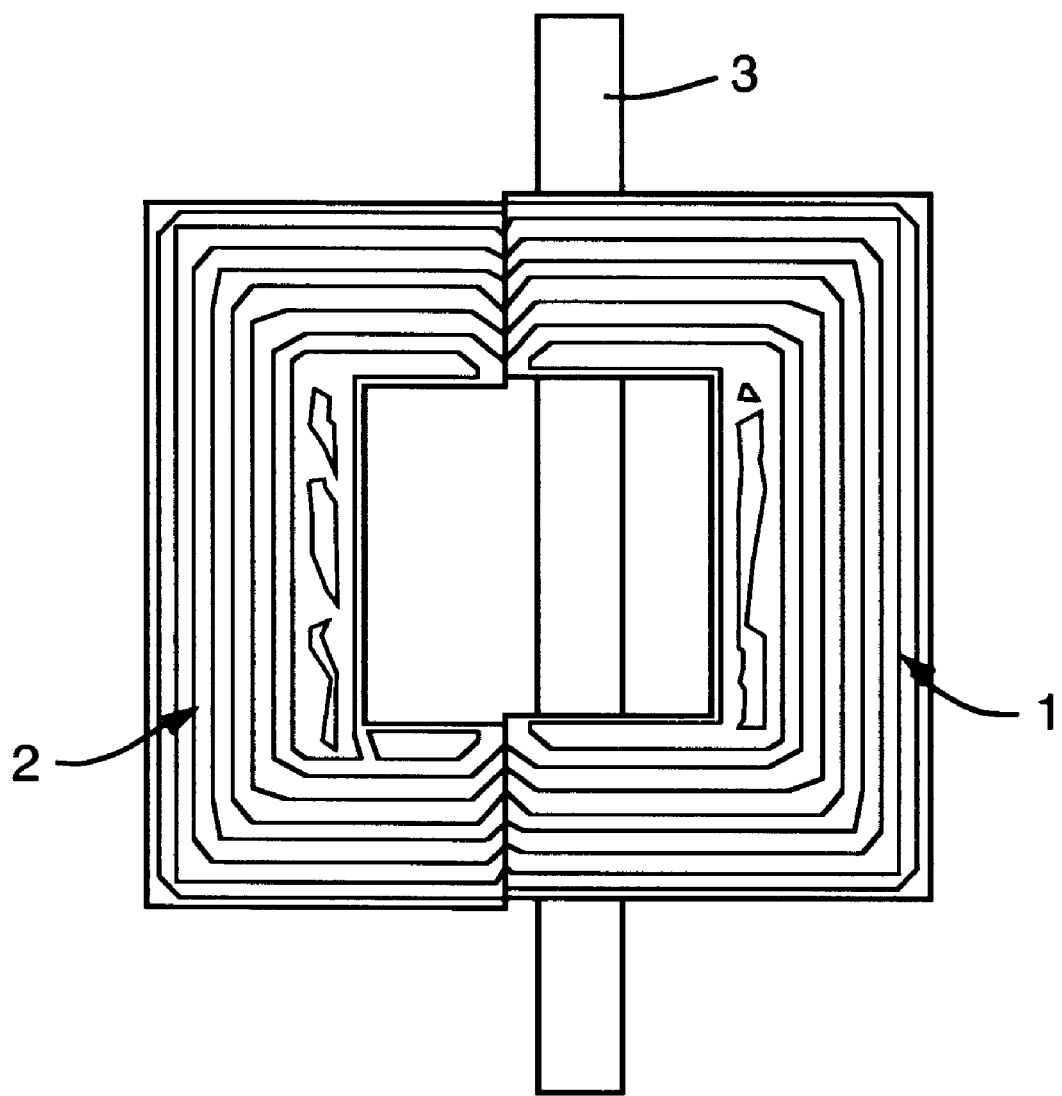
FIG. 7 is a magnetic Finite Element Analysis graph of the prior art motor depicted in FIG. 6 with the rotor offset axially to the stator.

FIGS. 6 and 7 are FEA's of a prior art shaded pole motor design. In FIGS. 6 and 7, the motor has a stator 1 with a length that is equal to the length of a rotor 2 which is attached to shaft 3. When the stator 1 and the rotor 2 are aligned as in FIG. 6, the magnetic force on the rotor 2 is $0.11511(10^2)$Nm/m. When the stator 1 and the rotor 2 are not aligned, the magnetic force on the rotor is $0.11342(10^2)$Nm/m. The net energy change, i.e., the magnetic stored energy, is $0.00169(10^2)$Nm/m=$\Delta E1$.

Figure 8:
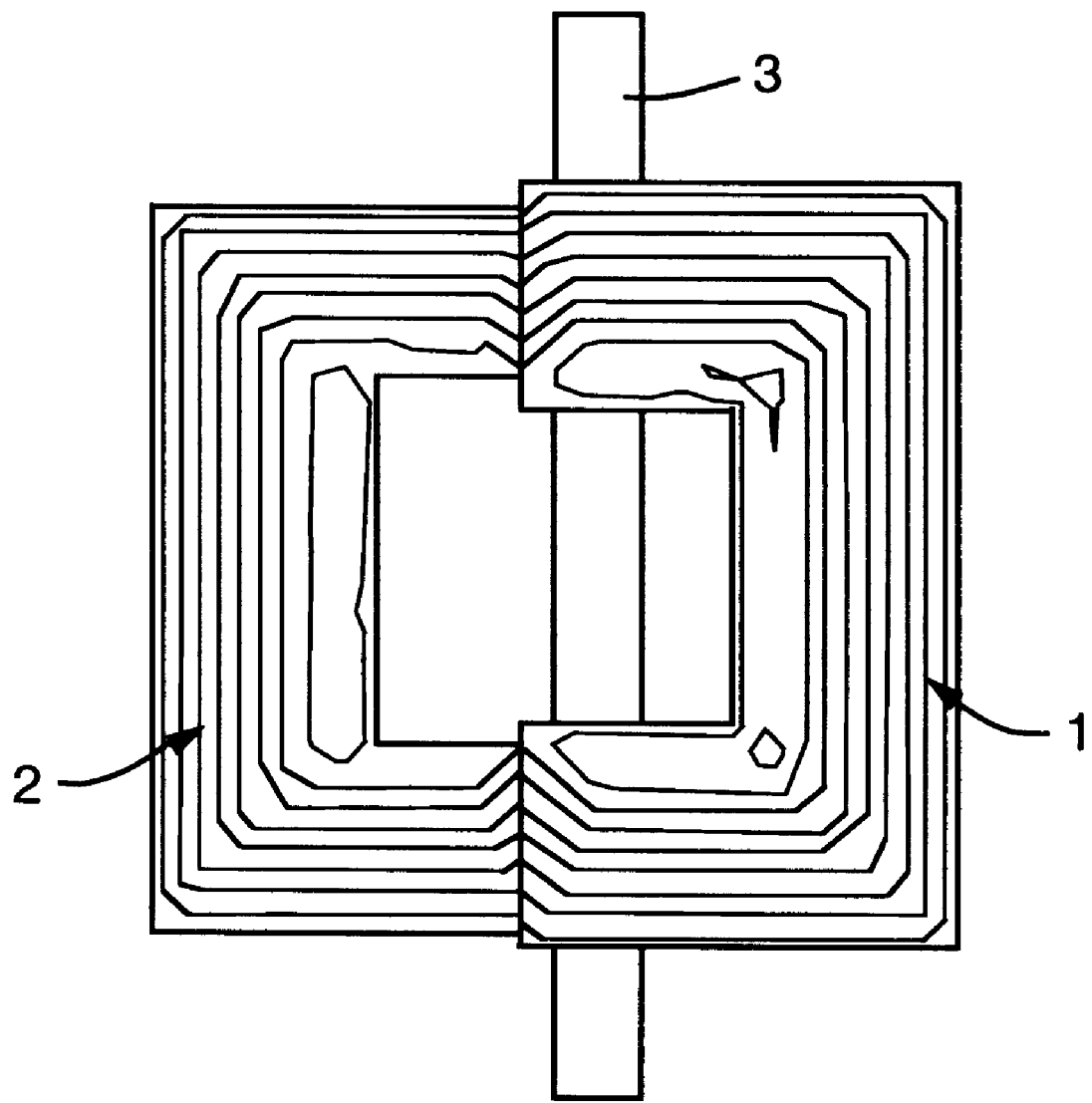
FIG. 8 is a magnetic Finite Element Analysis graph of a motor according to one embodiment of the invention with a short rotor/long stator assembly according to one embodiment of the invention.
Figure 9:
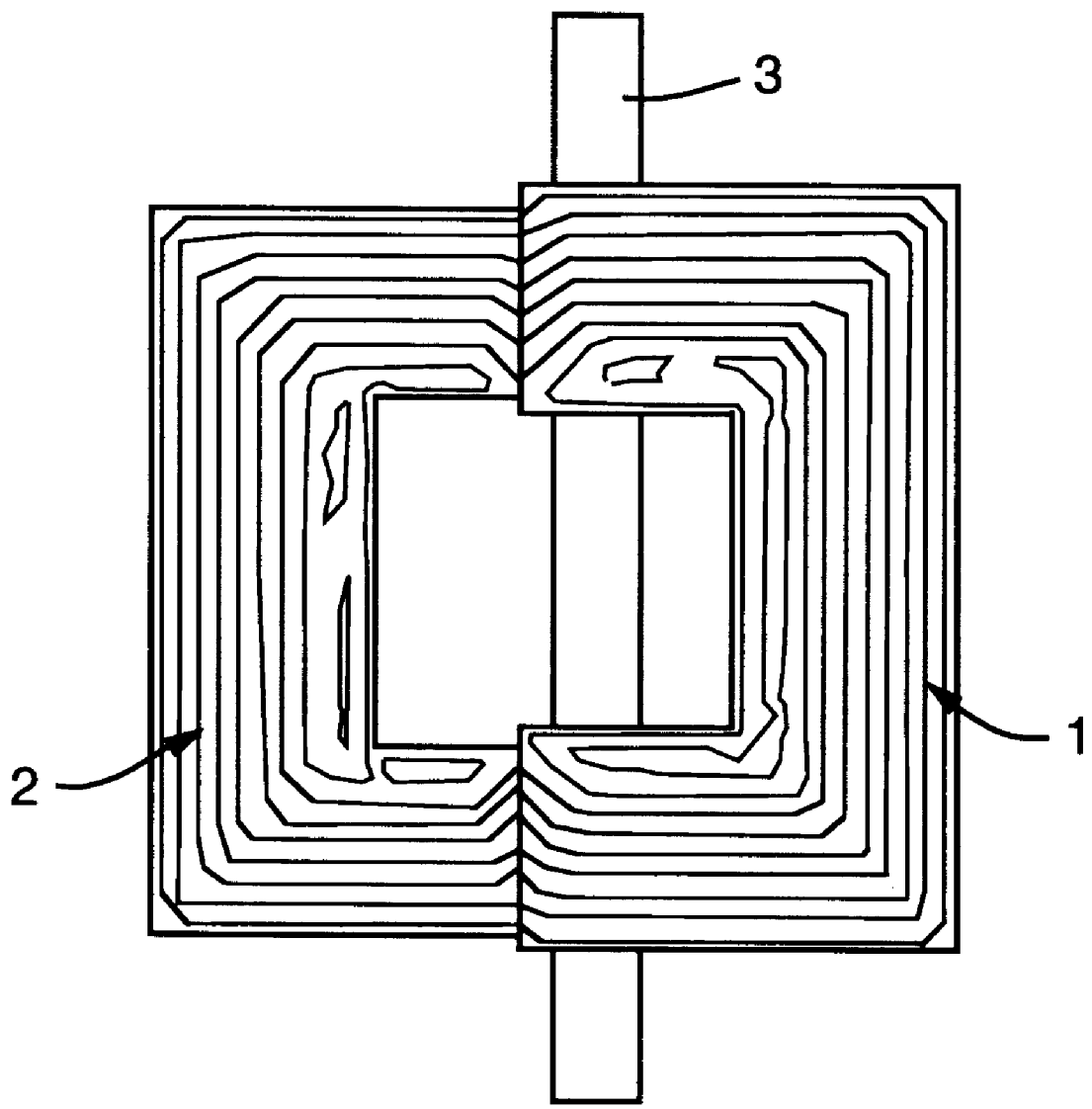
FIG. 9 is a magnetic Finite Element Analysis graph of a motor with a short rotor/long stator assembly with the rotor offset axially to the stator.

Contrasted with the prior art motor, FIGS. 8 and 9 show the results for a motor made in accordance with the present invention. In FIG. 8, the rotor 2, which is shorter than the stator 1, is centered within the axial length of the stator 2. With this configuration, the magnetic force on the rotor is $0.11138(10^2)$Nm/m. In FIG. 9, the rotor 2, which is shorter than the stator 1, is offset relative to the axial length of the stator 2. With this configuration, the magnetic force is $0.11081(10^2)$Nm/m. The net energy change, i.e., the magnetic stored energy, is $0.00057(10^2)$Nm/m=$\Delta E2$.

The percent reduction in magnetic stored energy provided by the invention relative to the tested prior art motor equals $100(\Delta E1-\Delta E2/\Delta E1)$. $100(0.00169-0.00057/0.00169)=66\%$. Accordingly, the test results demonstrate that when compared to a conventional prior art motor, the invention provides a 66% drop in the amount of axial forces passed through the rotor/shaft assembly during motor operation when the only change made between the motors is the lengthening of the stator or shortening of the rotor.

Figure 10:
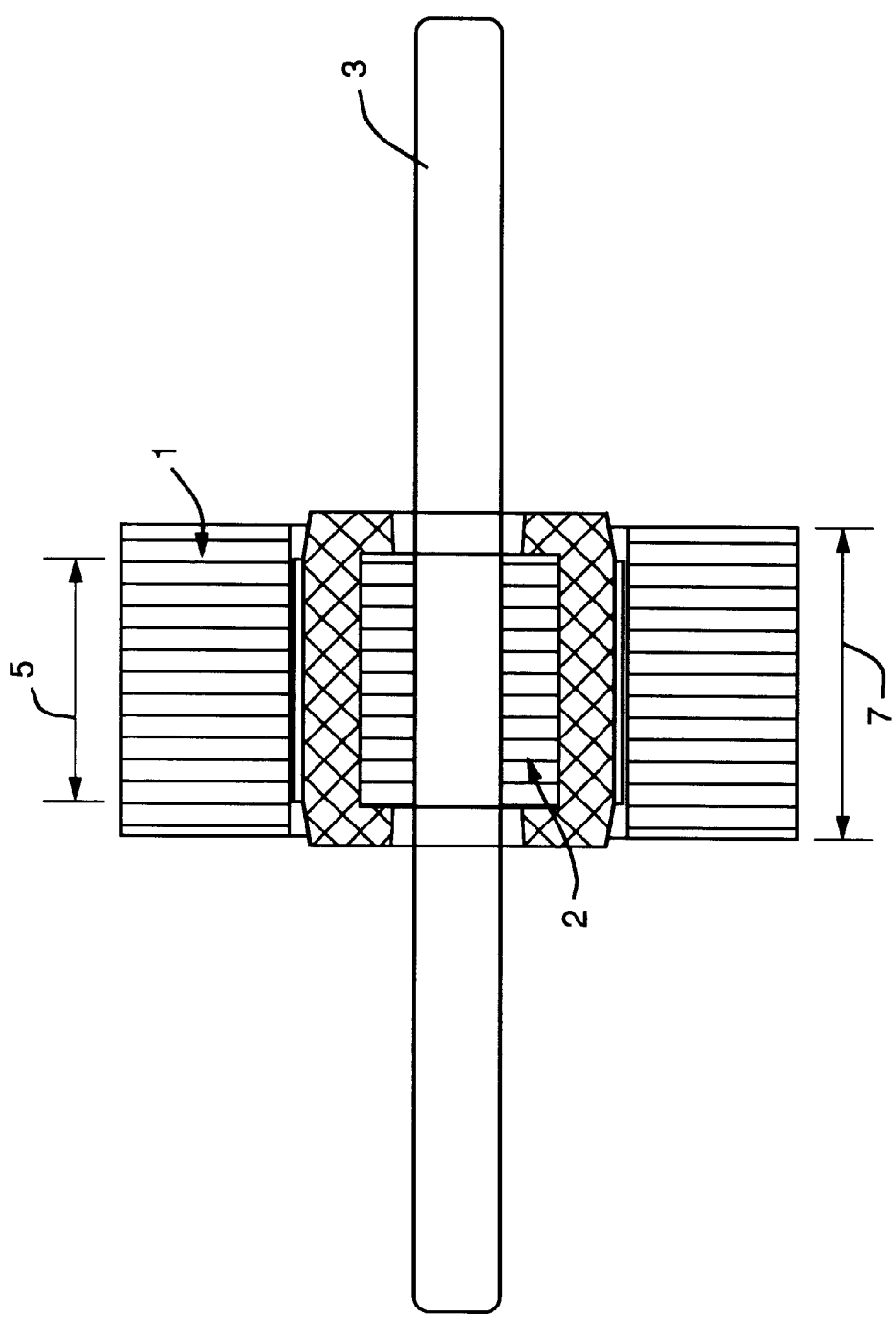
FIG. 10 is a rotor/shaft/stator assembly according to one embodiment of the invention.

It has been found that the beneficial aspects of the invention are manifested when the axial length of the rotor is about between $\frac{1}{8}$ to $\frac{2}{8}$ of an inch shorter than the axial length of the stator. This is accomplished by simply varying the number of laminations used to make the stator 1 or rotor 2 as shown in FIG. 10.

It is postulated that by shortening the rotor relative to the stator and initially centering the rotor within the axial dimension of the stator, the rotor is trapped within the magnetic flux of the stator field when the motor is operated. The ultimate result is that the noise/vibration created by oscillation/axial movement of the rotor/shaft assembly is markedly reduced.

It is to be understood that the present invention is by no means limited to the particular constructions herein disclosed and/or shown in the drawings, but also comprises any modifications or equivalents within the scope of the claims.

Having thus described our invention, what we claim as new and desire to secure by United States Letters Patent is:

1. A method of reducing noise/vibration caused by oscillation of an electric motor rotor including steps of:

providing a stator having an axial length;

providing a rotor having an axial length which is about between $\frac{1}{8}$ to $\frac{2}{8}$ inches shorter than said axial length of said stator;

applying an electric current to said electric motor which generates a magnetic flux within said electric motor to cause said rotor to rotate with a stator field.

\* \* \* \* \*